Figure 1:
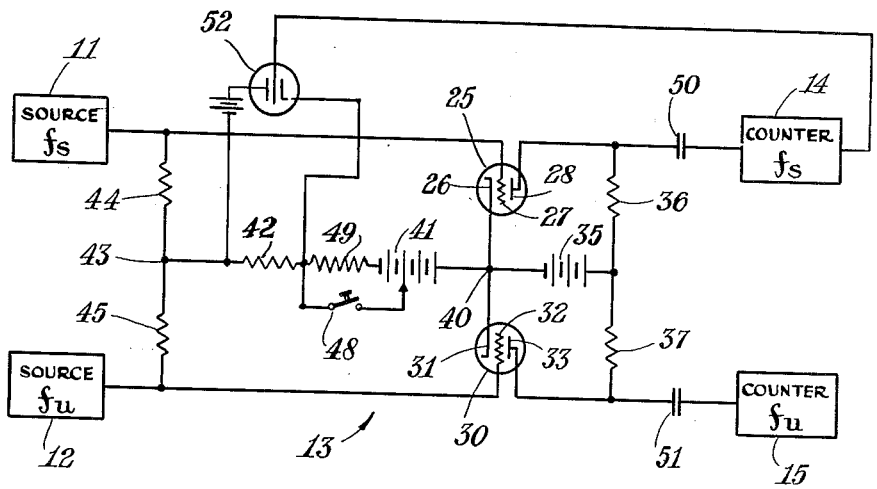

Nov. 27, 1951

F. G. BROCKMAN 2,576,900

FREQUENCY MEASURING DEVICE

Filed June 13, 1946

*FRANK G. BROCKMAN*
INVENTOR.

BY

AGENT

Patented Nov. 27, 1951

2,576,900

UNITED STATES PATENT OFFICE 2,576,900

FREQUENCY MEASURING DEVICE

Frank G. Brockman, Dobbs Ferry, N. Y., assignor to Philips Laboratories, Inc., Irvington on Hudson, N. Y.

Application June 13, 1946, Serial No. 676,383

4 Claims. (Cl. 235—92)

My invention relates to frequency measuring devices and, more specifically, to an improved device for accurate frequency measurements of electric voltages.

Determination of the frequency of A.-C. voltages, or recurrent electric voltage phenomenon, has been accomplished heretofore by a comparison of frequencies. The comparison method usually involves heterodyning a voltage of standard frequency with a voltage of unknown frequency to produce a beat note, which, for example, may be zero beat when the frequency of the standard source is suitably adjusted. The unknown frequency may then be calculated. The comparison method may entail the use of considerable related apparatus. Furthermore, it is often necessary to utilize harmonic voltages of the frequency standard in producing a detectable beat note, and it is sometimes difficult to determine which harmonic is being utilized, particularly when frequencies having a value of the order of ten times or more of the frequency of the standard are to be measured. Also the comparison method is often tedious and frequently involves careful adjustments by the observer or operator of the equipment.

It is an object of my invention to provide simple and accurate means for determining the frequency of a recurrent electrical voltage phenomenon.

A further object of my invention is to provide an electronic device versatile in range for measuring the frequencies of voltages which may vary, for example, from one hundred kilocycles per second or less to frequencies of 50 megacycles per second or more.

Another object of my invention is to provide a device for measuring the frequency of recurrent electrical voltage phenomenon which affords easily interpreted indicating means that may be made direct reading.

A still further object of my invention is to provide a method for measuring frequency to a high degree of precision.

Still another object of my invention is to provide means for frequency measurement which avoids the necessity of the observer or operator utilizing harmonic voltages of the frequency standard being used.

Another object of my invention is to provide frequency measurement means which avoid the necessity of careful adjustment by the operator of the apparatus used.

These and further objects of the invention will appear as the specification progresses.

According to the invention an electronic switching circuit is utilized to simultaneously connect the voltage source of unknown frequency and the voltage source of standard frequency to respective counting circuits for an identical period of time. The counting circuits add each individual impulse, or variation of like polarity of the voltage being measured and of the voltage of standard frequency and preferably include suitable indicating or recording means thereby affording an indication of the number of signals of each of the two voltages during this period of time, whereby the unknown frequency is readily determined. The said identical period of time is preferably so selected and determined by the standard frequency that the resultant indication may be read directly on scale of ten or decade counters to avoid the necessity of any computations, and to give immediately the frequency to be measured in desired units to a desired degree of accuracy.

Figure 2:
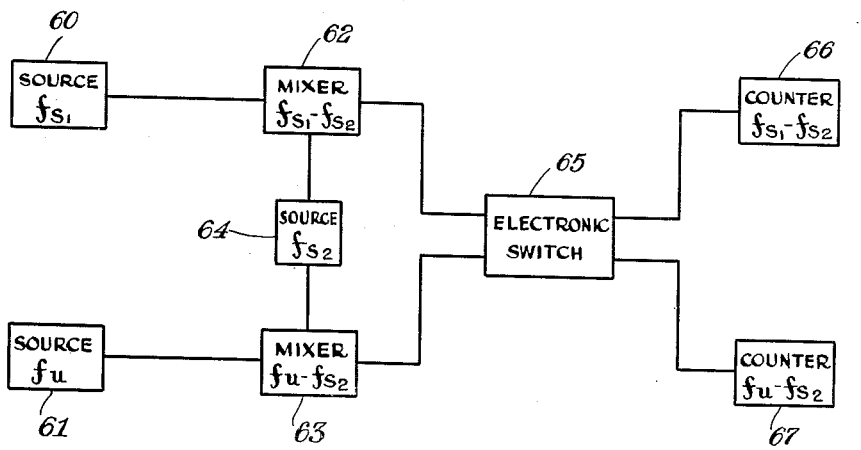

In order that the invention may be clearly understood and readily carried into effect, it will now be described more fully with reference to the accompanying drawing in which:

Fig. 1 illustrates diagrammatically, partially in block form, one preferred embodiment of my present invention; and Fig. 2 is a block diagram of another preferred embodiment of my invention particularly suited for determination of comparatively high frequencies.

Referring now more particularly to Figure 1, a voltage source 11 of standard frequency, $f_s$, and a voltage source 12 of an unknown frequency, $f_u$, which it is desired to ascertain, are coupled to an electronic switch 13. Electronic switch 13 operates to connect standard source 11 to a corresponding pulse counter 14, and simultaneously to connect source 12 of unknown frequency to a corresponding counter circuit 15. The counter circuits 14 and 15 may be any one of various circuits well known to the art as, for example, the decade counters described by Potter in "Electronics," June 1944, page 110 et seq. The Potter circuits employ a chain of vacuum tube stages arranged so that successive electrical impulses will cause triggering of various stages to produce a visual indication, or count, of the number of electrical impulses applied to the first stage.

Electronic switch 13 comprises a tube 25 having a cathode 26, a grid 27, and a plate 28 and also a tube 30 having a cathode 31, a grid 32, and a plate 33. A suitable source of plate voltage 35 is connected in the plate to cathode circuits, and suitable plate loads 36 and 37 are provided for plates 28 and 33 of tubes 25 and 30 respectively. The cathodes 26 and 31 are directly connected to each other at junction 40 and are then returned to the negative side of voltage source 35. A bias source 41, sufficient in voltage to insure that tubes 25 and 30 may be cut off, has its positive terminal connected to junction 40 and its negative terminal is connected through resistor 49 in series with resistor 42 to the junction 43 of grid resistors 44 and 45, the other terminals thereof being connected respectively to grids 27 and 32 of tubes 25 and 30. A manual switch 48 is connected across resistor 49 and a portion of voltage supply 41, as shown. This portion is so chosen that when manual switch 48 is closed, tubes 25 and 30 have their bias reduced to permit conduction, at least on positive peaks of the grid voltage signals. Electronic switch 13 is thereby made operable to connect sources 11 and 12 to counters 14 and 15 respectively. Condensers 50 and 51 are connected to plates 28 and 33 respectively, and voltages are fed there through to the counter circuits 14 and 15 respectively from plates 28 and 33. When manual switch 48 is open, sources 11 and 12 are disconnected from counters 14 and 15 respectively.

In operation, manual switch 48 normally remains open. Before an operator prepares to obtain a frequency determination, the counters 14 and 15 are reset to zero readings, or readings may be recorded. Manual switch 48 is then closed by the operator, whereupon tubes 25 and 30, which have theretofore been biased to cut-off, are simultaneously made operable, and a counting period is initiated. Signals from standard frequency source 11 are applied to grid 27, and after amplification in tube 25 are fed by condenser 50 to counter 14. Likewise, signals from the voltage source 12 of unknown frequency are applied to grid 32 and are operable to cause signals to appear at plate 33, and these signals are applied to counter 15 through condenser 51. Manual switch 48 is opened after a suitable time. The exact time at which switch 48 is opened is not critical, and may be determined largely by the degree of accuracy desired, or considerations of convenience. If desired, automatic means may be employed to close and open switch 48. After the opening of switch 48, electronic switch 13 is opened, that is, both tubes 25 and 30 simultaneously cease conduction, and are non-operable to pass the signals appearing at their grids. Thus the counting period which was initiated with the closing of manual switch 48 is terminated by the opening thereof after a suitable interval. Since counters 15 and 14 received signals respectively from unknown source 12 and standard source 11 for identical periods of time, it is clear that the ratio of the unknown to the standard frequency will be determined by the ratio of the count appearing on counter 15 to that appearing on counter 14. It will be understood by those skilled in the art that certain voltage forms may be more efficient and certain in producing operation of counters such as 14 and 15. Therefore, it may be desirable to include in what has been diagrammed as source 11 and source 12 circuits designed to produce appropriate voltage wave forms synchronized with the unknown frequency voltage and with the standard frequency voltage, and thereby to obtain the optimum voltage shapes for actuating counters 14 and 15. Such wave shaping circuits may be included in what is diagrammed as counters 14 and 15, or the desired voltage shapes may be produced by suitable operating conditions for tubes 25 and 30, or they may be produced in circuits in counters 14 and 15, or any combination of these. The counters may be presumed to count recurrences of the voltage variations of the respective sources, and the following relation is readily deduced:

$$f_u = \frac{N_u}{N_s} f_s$$

where $N_u$ is the number of recurrences of the unknown frequency voltage variations counted by counter 15, and $N_s$ the number of recurrences of voltage variations of the standard frequency source 12 indicated by counter 14. If the Potter circuit hereinbefore mentioned is employed for counters, the number of decade counters required will be a function of the number of desired significant digits in the numerical value of the frequency to be measured. Thus, if it is desired to measure a frequency in the neighborhood of five hundred kilocycles per second to a precision of one cycle per second it will be necessary to employ six decade counters in sequence.

Optionally, the system may be improved still further by the addition of means for automatically terminating the counting period during which the electronic switch permits signals to be fed to the counters. It may also be made direct reading. As an example of the manner in which these further improvements may be accomplished, assume that counter 14 is composed of six decade counters, so that when the last tube of the last decade counter is pulsed or actuated, the reading on the counter will return to its original zero registration. This will occur on the millionth pulse. The resulting pulse from the final stage of the decade counters may be used to cause a second electronic switch to become operable, which controls electronic switch 13 causing it to open and block signals to the counters. For example, this millionth pulse could cause conduction through a grid controlled gas-filled tube 52, such as a thyratron, in such a manner as to draw current through resistor 42 with a polarity and amperage to cause electronic switch 13 to open-circuit automatically by cutting off tubes 25 and 30. As shown in Fig. 1, the pulse from the output of counter 14 is applied to the grid of tube 52, the cathode thereof being connected to one end of resistor 42 and the anode being connected through a suitable voltage source to the other end of said resistor. As an example of its utility, suppose the standard source 11 to have a frequency of one megacycle per second and counter 14 to comprise six decade counters as mentioned hereinbefore. Then the reading on counter 15 will be the frequency in cycles per second, with no computation required by the operator. Switch 13 will open after 1,000,000 cycles of the voltage of source 11, that is, one second after initiation of a counting period by closing line switch 48.

A further advantage of the embodiment of Fig. 1 resides in the fact that statistical frequencies may be determined thereby. For example, it may be desirable to investigate the average frequency of repetition of some voltage phenomenon not necessarily cyclic, that is, not regularly recurrent in time. Such investigation is readily made by using the embodiment of Fig. 1.

Referring now more particularly to Fig. 2 there is illustrated a block diagram of a circuit whereby I extend the range of measurement afforded by my invention to higher frequencies. A voltage source 60 and a voltage source 61 of unknown frequency are connected respectively to mixing circuits 62 and 63. A second standard frequency voltage source 64 is also connected to mixers 62 and 63. The output of mixers 62 and 63 are connected to an electronic switch 65 which may be similar to the switch 13 of Fig. 1. Switch 65 serves to connect the output of mixer 62 to counter 66 and the output of mixer 63 to counter 67 simultaneously at the initiation of a counting period and after a suitable time simultaneously disconnects them. Mixers 62 and 63 may include appropriate filtering circuits so that the voltages fed therefrom to electronic switch 65 include the difference in frequencies only, that is, the voltage fed from mixer 62 shall be the difference $f_{s1}$ minus $f_{s2}$ and the voltage fed from mixer 62 to electronic switch 65 shall be $f_u$ minus $f_{s2}$. It will be clear by comparison of Fig. 2 to Fig. 1 that the ratio of the reading on counters 67 and 66 will be indicative of the ratio of the frequencies $$\frac{f_u - f_{s2}}{f_{s1} - f_{s2}}$$

since the voltages to switch 65 may be considered as derived from sources which respectively comprise a known and an unknown frequency voltage source.

While I have described my invention in connection with specific examples and certain applications, I do not desire to be limited thereto, because variations will present themselves to one skilled in the art.

What I claim is:

1. A device for measuring the frequency of variations of a voltage, comprising coupling means for a first voltage source the frequency of variations of which is to be measured, a second voltage source of known frequency, a third voltage source of known frequency, first voltage mixing means connected to said first and third sources providing a first mixed voltage source, second voltage mixing means connected to said second and third sources providing a second mixed voltage source, first counting means responsive to said first mixed voltage, second counting means responsive to said second mixed voltage, and switching means for simultaneously coupling said first voltage source to said first counting means and said second voltage source to said second counting means, and for simultaneously de-coupling said first voltage source from said first counting means and said second voltage source from said second counting means.

2. A device for measuring the frequency of variations of a voltage, comprising coupling means for a first voltage source the frequency of variations of which is to be measured, a second voltage source of known frequency, first counting means responsive to the variations of said first voltage source, second counting means responsive to said second source, first and second amplifier circuits connected respectively between said first source and said first counting means and between said second source and said second counting means, said first and second amplifier circuits each including a grid-controlled vacuum tube and a common source of bias voltage connected to the grids of said tubes, the magnitude of said bias source being such as normally to bias said tubes beyond cut-off, and means including a switch for connecting the grids of said tubes to an intermediate voltage point in said bias source whereby said tubes are rendered conductive and said first and second voltage sources are simultaneously connected respectively to said first and second counting means.

3. A device for measuring the frequency of variations of a voltage, comprising coupling means for a first voltage source the frequency of variations of which is to be measured, a second voltage source of known frequency, a third voltage source of known frequency, first mixing means coupled to said first and third sources providing a first mixed voltage source, second mixing means coupled to said second and third sources providing a second mixed voltage source, first counting means responsive to said first mixed voltage, second counting means responsive to said second mixed voltage, and electronic switch means interposed between said first mixing means and said first counting means and between said second mixing means and said second counting means for simultaneously coupling each of said mixing means to the respective counting means.

4. A device for measuring the frequency of variations of a voltage, comprising coupling means for a first voltage source the frequency of variation of which is to be measured, a second voltage source of known frequency, a third voltage source of known frequency, first mixing means coupled to said first and third sources providing a first mixed voltage source, second mixing means coupled to said second and third sources providing a second mixed voltage source, first counting means responsive to said first mixed voltage, second counting means responsive to said second mixed voltage, electronic switch means interposed between said first mixing means and said first counting means and between said second mixing means and said second counting means for simultaneously coupling respectively said first and second mixing means to said first and second counting means, and vacuum tube means responsive to said second counting means and interconnected with said electronic switch means whereby said mixing means are simultaneously disconnected from the respective counting means.

FRANK G. BROCKMAN.

REFERENCES CITED

The following references are of record in the file of this patent:

UNITED STATES PATENTS

| Number | Name | Date |
|---|---|---|
| 1,039,564 | Matthews et al. | Sept. 24, 1912 |
| 1,846,314 | Crossley | Feb. 23, 1932 |
| 1,916,782 | Crossley | July 4, 1933 |
| 2,176,742 | Pierre | Oct. 17, 1939 |
| 2,405,597 | Miller | Apr. 13, 1946 |
| 2,408,451 | Sorensen | Oct. 1, 1946 |
| 2,516,189 | Dinsmore | July 25, 1950 |

FOREIGN PATENTS

| Number | Country | Date |
|---|---|---|
| 355,705 | Great Britain | 1931 |